Jan. 1, 1924
R. C. KIRCH
1,479,303
AUTOMOBILE HEAT DISTRIBUTOR
Filed June 25, 1923    2 Sheets-Sheet 1
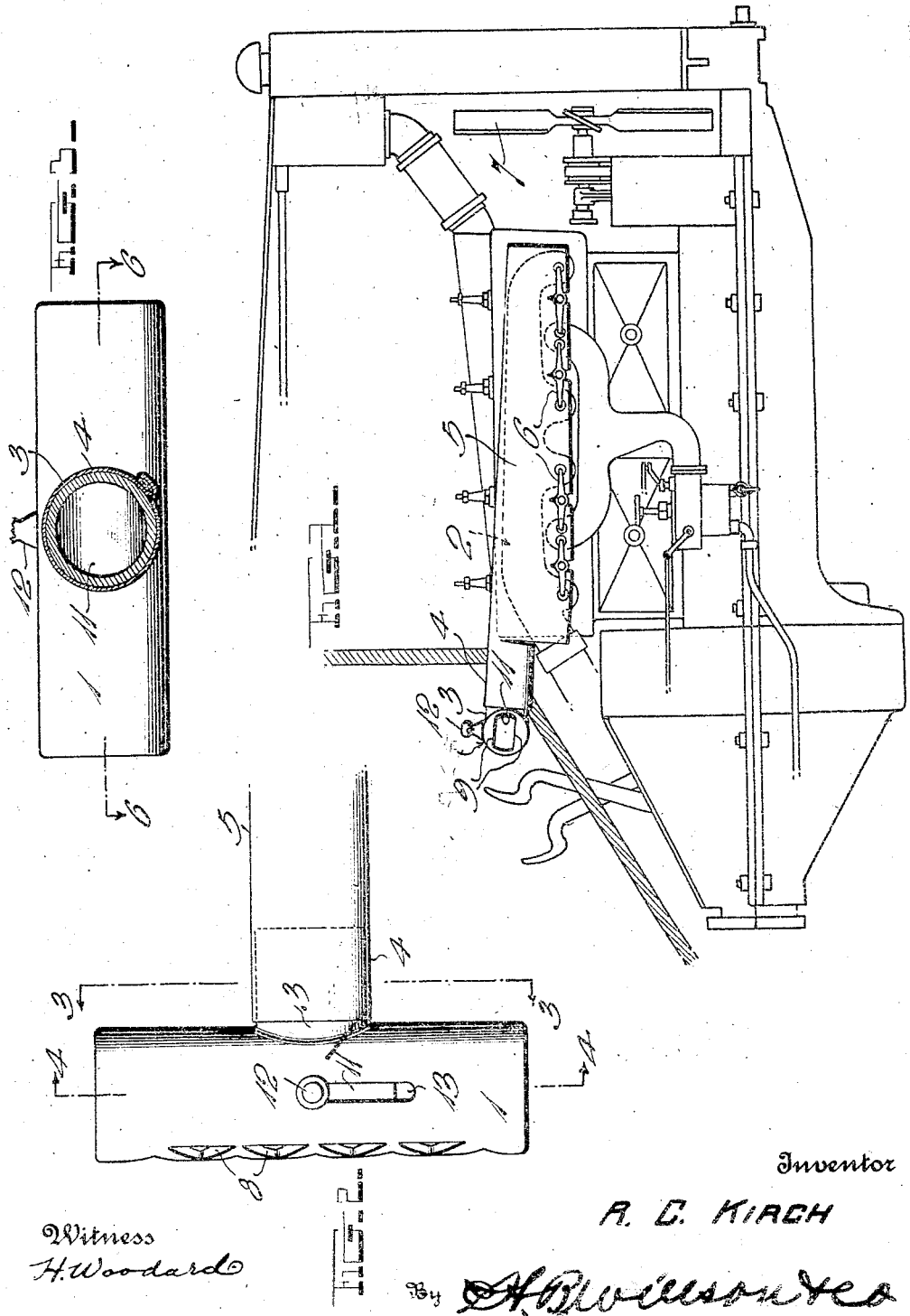
Witness
H. Woodard
Inventor
R. C. KIRCH
By H. Willson &co.
Attorneys

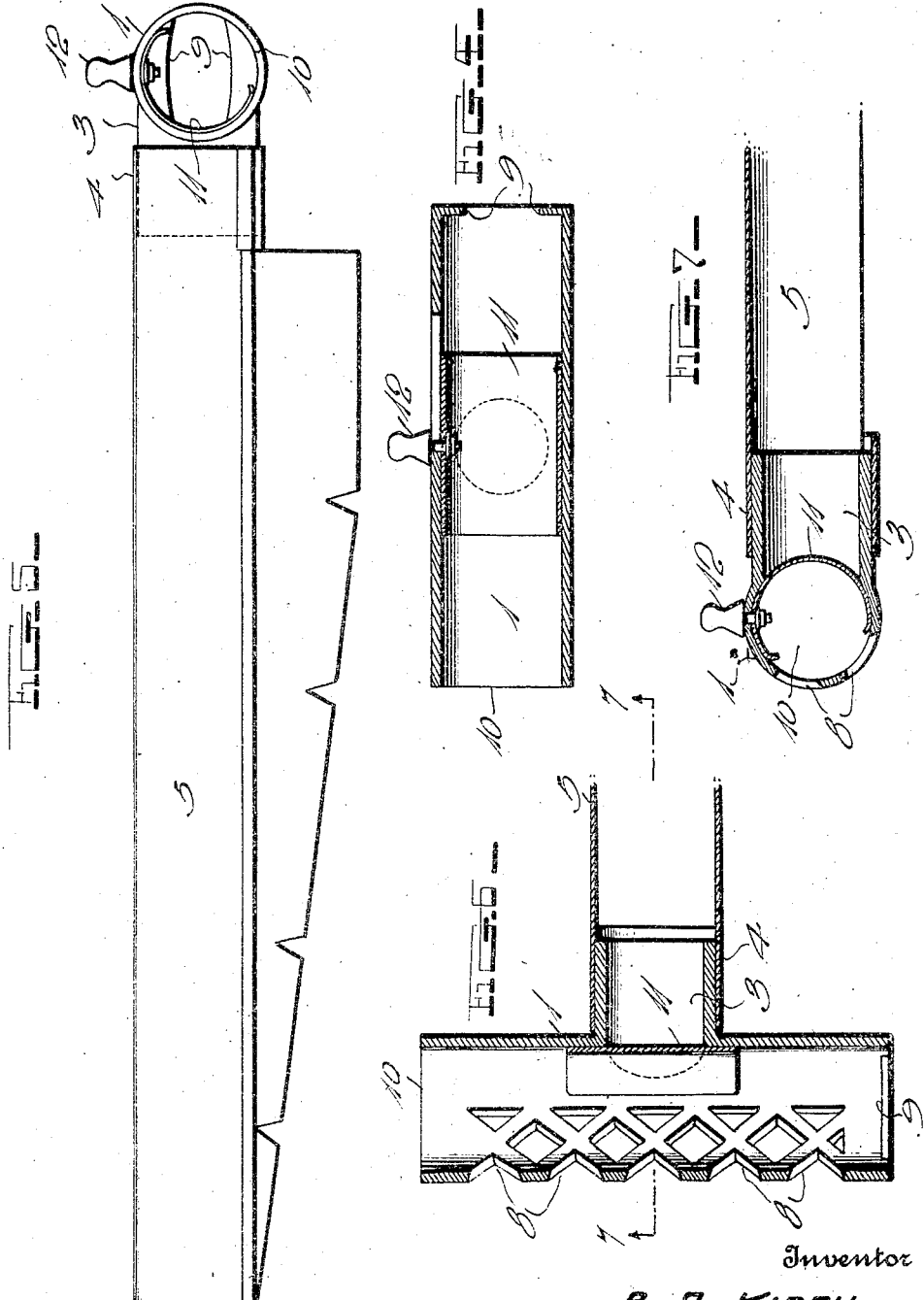

Patented Jan. 1, 1924.

1,479,303

UNITED STATES PATENT OFFICE.

RALPH CHARLES KIRCH, OF KEOKUK, IOWA, ASSIGNOR TO WEBER-KIRCH MFG. CO., OF KEOKUK, IOWA, A CORPORATION.

AUTOMOBILE HEAT DISTRIBUTOR.

Application filed June 25, 1923. Serial No. 647,665.

*To all whom it may concern:*

Be it known that I, RALPH CHARLES KIRCH, a citizen of the United States, residing at Keokuk, in the county of Lee and State of Iowa, have invented certain new and useful Improvements in Automobile Heat Distributors; and I do declare the following to be a full, clear, and exact description of the invention, such as will enable others skilled in the art to which it appertains to make and use the same.

My invention has for its object to provide an extremely simple and inexpensive, yet a highly efficient and desirable automobile heat distributor which will receive its heat from the exhaust manifold and distribute it uniformly in the body of the car, regardless of the fact that the heater is located in one front corner of the body, directly behind the manifold.

With the foregoing in view, the invention resides in the novel subject matter hereinafter described and claimed, the description being supplemented by the accompanying drawings in which:—

Figure 1 is an elevation partly in section, showing the application of my invention to an automobile.

Fig. 2 is a plan view of the heat register which distributes the heat in the body.

Figs. 3 and 4 are vertical transverse sectional views as indicated by lines 3—3 and 4—4 of Fig. 2.

Fig. 5 is a side elevation of the heater looking in the opposite direction from Fig. 1.

Fig. 6 is a horizontal sectional view as indicated by line 6—6 of Fig. 3.

Fig. 7 is a vertical sectional view on line 7—7 of Fig. 6.

In the drawings above briefly described, the numeral 1 designates a horizontally elongated cylinder for transverse disposition in one front corner of an automobile body, directly behind the exhaust manifold 2. The cylinder 1 is provided at its front side with a heat inlet nipple 3 which communicates with a neck 4 on the rear end of an elongated hood 5 which extends over the manifold 2 and may be secured in place by the usual clamps 6. The front end of the hood 5 is open so that the well known motor fan 7 will direct a rearward current of air through said hood to be heated by contact with the manifold 2, the heated air being discharged from the cylinder 1 which is of novel form to insure even distribution in the machine.

The rear and lower portions of the cylinder 1 are provided substantially throughout their lengths with a plurality of heat escape openings 8 which direct the main hot air currents over the foot-boards of the machine. The cylinder is necessarily placed adjacent one side of the body, in order that it may be directly behind the manifold 2 and if hot air were allowed to escape uniformly from both ends of said cylinder, the machine would be unevenly heated. I therefore restrict the end of the cylinder adjacent said one side of the body, by providing it with a pair of flanges or webs 9 or other suitable heat checking means. The other end 10 of the cylinder however, is entirely open and thus a greater amount of heat will be discharged from this end and the distribution of heat in the body will be substantially uniform.

For controlling the entrance of heat through the nipple 3, I provide an arcuate damper 11 which contacts yieldably and slidably with the inner side of the cylinder 1, said damper plate being provided with an operating rod 12, a portion of which extends through a longitudinal slot 13 in the upper side of the cylinder 1. The damper plate 11 is more or less resilient and will thus yieldably contact with the cylinder to not only hold said plate in adjusted position, but to prevent possibility of rattling. As seen clearly in Fig. 7, this plate is of insufficient width to obstruct any of the heat escape openings 8.

By providing the novel construction disclosed, an exceptionally simple and inexpensive heat distributor is provided, yet one which will be very efficient and will not only heat by circulation of hot air, but by radiation, as the cylinder 1 becomes heated from the hot air passing therethrough.

As excellent results have been obtained from the details disclosed, these details are preferably followed, but within the scope of the invention as claimed, numerous minor changes may be made.

I claim:—

1. A motor vehicle heat distributor comprising a hollow elongated cylinder for transverse disposition in the front end of a vehicle body near one side of the latter, said cylinder having a restricted open end for choking down discharge of heat adjacent said one side of the body and having its other end open and relatively unrestricted for discharging a greater amount of heat toward the other side of the body, the front side of said cylinder having a hot air inlet and the rear and lower sides thereof being provided with heat escape openings substantially throughout its length.

2. A structure as specified in claim 1; said cylinder having a longitudinal slot, an arcuate damper plate slidably and yieldably contacting with the inner side of said cylinder for controlling said hot air inlet, and an operating knob for said damper plate passing outwardly through said slot, said damper plate being of insufficient width to obstruct any of said heat escape openings.

In testimony whereof I have hereunto affixed my signature.

RALPH CHARLES KIRCH.